Dec. 8, 1931.  H. A. CALDERWOOD  1,835,633
OUTLET BOX
Filed July 10, 1928
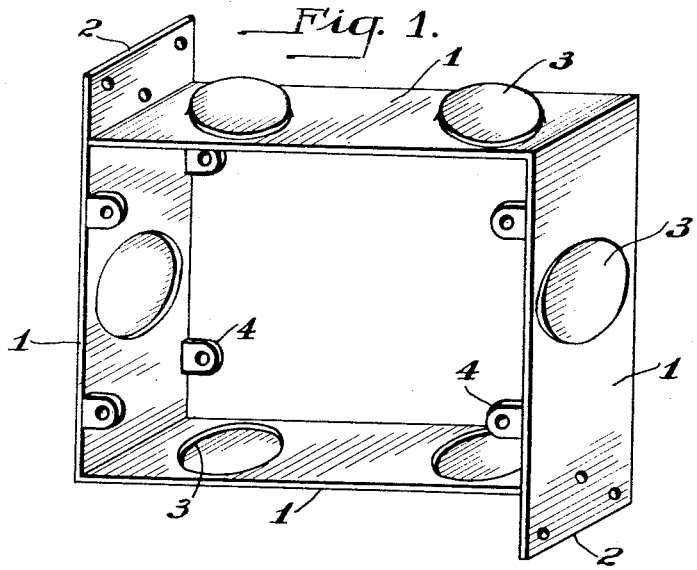
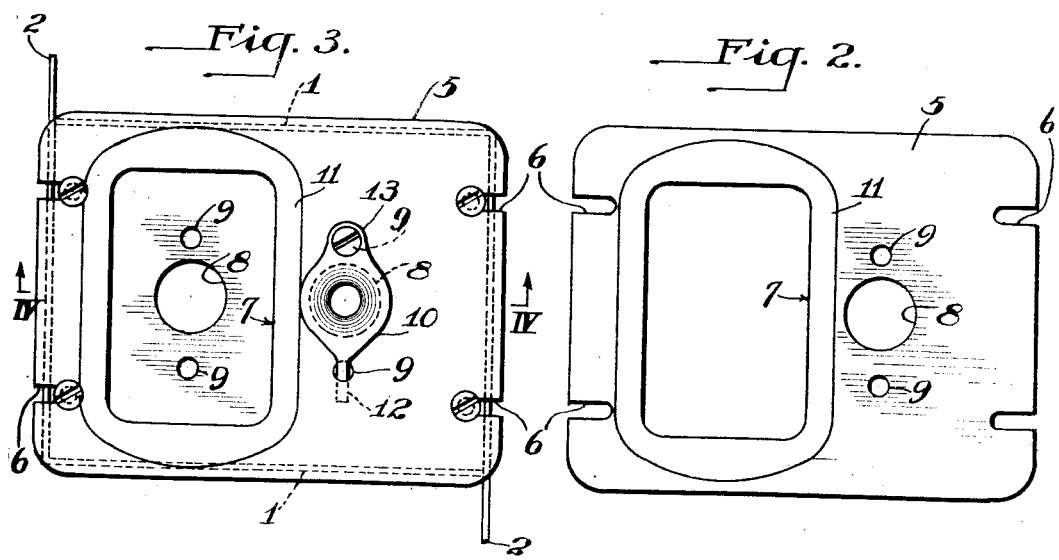
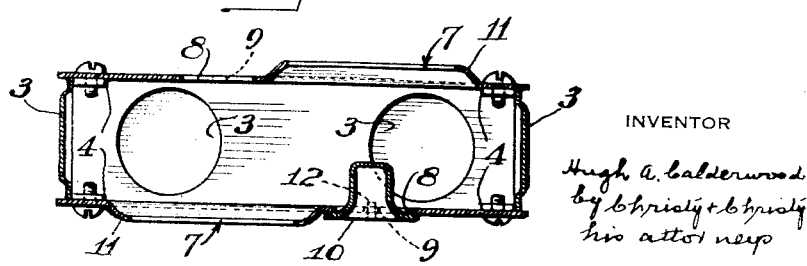
WITNESS
AB Wallace
INVENTOR
Hugh A. Calderwood
by Christy & Christy
his attorneys Patented Dec. 8, 1931

1,835,633

UNITED STATES PATENT OFFICE

HUGH A. CALDERWOOD, OF PITTSBURGH, PENNSYLVANIA, ASSIGNOR, BY MESNE ASSIGNMENTS, TO NATIONAL ELECTRIC PRODUCTS CORPORATION, A CORPORATION OF DELAWARE

OUTLET BOX

Application filed July 10, 1928. Serial No. 291,517.

In the wiring of buildings it frequently happens that to suit peculiar conditions of the building structure, or the desires of the builder, it becomes necessary to locate electrical wall-switches, receptacles for attachment of portable devices, and lighting fixtures at points on a partition which are diametrically opposite to each other or approximately so.

Partition walls range in thickness from less than two inches to as much as five inches, and in some cases more than five inches. Those whose thickness is of the order of two inches are sometimes referred to as "thin," and those of the order of five inches as "thick", walls.

A safety requirement in practically all electrical wiring codes, building ordinances and similar laws and codes, is that metal enclosing cases or outlet-boxes shall be installed at all outlets for switches, receptacles, lighting brackets, etc. When outlets are located on opposite sides of thick partitions or walls no especial difficulty is encountered, because two separate outlet-boxes or fittings of commercial types having the well-known features of unitary structure of back wall and side walls, may be mounted back to back with their open faces on opposite sides of the wall, and conduits and wires supplying them may have independent entrance through the customary openings or "knockouts" in the walls of each box, if on separate circuits, or if both of the fixtures or other electrical devices are to be connected to the same circuit, then the conduits and wires or cables may enter or feed into one box and be extended into the other through pipe nipples inserted in aligning knockouts or entrance holes in the backs of the two boxes installed as described above, which, with their covers, if any, and contained switches or receptacles, remain within and practically flush with the surfaces of the wall.

When, however, outlets are located adjacent to each other on opposite sides of thin partitions or walls, difficulties and complications arise, due to the fact that many electrical devices, switches, receptacles, etc., are of such dimensions, that is to say, so thick measured from front to back, and the required standard metal enclosing fittings or boxes are necessarily so deep that two of them placed back to back will in many cases be greater in total depth than the thickness of the aforesaid thin walls, and, if so installed, one or both would project unduly beyond the face of the wall.

I am aware that the undue projection can be masked to a degree by the use of an ornamental mat or frame of wood or other material, but this adds to the cost of the installation, and the interference and the objectionable projection remain.

Another condition which my improved outlet fitting will overcome in a convenient way and with accompanying reduction in cost, is that in which two switches or receptacles which are too deep for back to back mounting may be located on opposite faces of a wall or partition with their sides closely adjacent and overlapping. This will ordinarily require two separate boxes, and if the devices are to be electrically connected on the same circuit, the interconnection of the two boxes is accomplished only at considerable effort and expense. By the use of my invention two such oppositely faced devices may be included in the one enclosure, and thus avoid the expense of conduit nipples or jumpers from box to box.

To overcome the difficulties and objectionable features of the described installation of electrical devices and fixtures in adjacent outlets in opposite faces of walls and partitions, and to reduce the labor and cost of making such installations, I have invented an outlet-box or frame, and covers for same to be used in combination therewith, which I will now proceed to describe and to illustrate by the accompanying drawings.

In the accompanying drawings Figure 1 is a view in perspective of the frame of an outlet box or enclosure embodying the invention. Figure 2 is a plan view of one of the covers. Figure 3 is a face view of the box with the cover attached, and additional fittings to be referred to. Figure 4 is a cross-section of the box taken on the line IV—IV of Figure 3.

The side walls 1 of the box constitute an open frame which may be of any desired shape, being shown herein as rectangular. This frame may be formed of a single strip of metal, or as herein shown it may be formed of two strips bent at right angles so as to give opposite projecting portions 2 for more firmly securing it within the wall. The usual knockout openings 3 are formed in the walls 1, and these walls also have means, such as threaded lugs 4, 4 for the attachment of the covers or closures of the open faces of the box. The cover 5 shown in Figure 2 is provided with the notches 6 in its edges for screws securing it to the lugs 4, and it has in its face an outlet opening 7 and a knock-out opening 8, the small holes 9, 9 being arranged symmetrically with relation to the knockout opening 8 for the attachment of a fixture stud in such knockout opening in the usual way. The cover 5 for the opposite side of the box may be the same in construction but reversely arranged, namely, with its outlet opening 7 arranged opposite to the knockout opening 8, as shown in Figure 4.

The outlet opening in an outlet-box cover is usually located with its center coincident with the center of the cover itself, and it is a novel feature of my device that the outlet opening in the cover is located off-center, and the hole for the reception of the fixture-stud is also located off-center, all in such relation that when the two covers are attached to opposite faces of the rectangular supporting frame as shown in Figure 4, the fixture-stud mounting hole in each cover will be behind and at the approximate center of the rectangular opening in the opposite cover.

Several useful results may be obtained with my invention; for example, two electric light bracket fixtures may be installed by attachment to the respective fixture-studs 10 and be faced in opposite directions on two sides of a partition wall, and be supplied with current from wires all connected within the enclosure, at substantially lower cost than if two separate boxes were used. Two switches or receptacles may be installed with their sides parallel when the covers are in the position shown in Figure 4, or a switch may be installed on one side and a lighting bracket or a convenience receptacle on the other.

It is obvious that instead of having two separable covers, a box might be constructed with side walls and a back portion arranged with openings similar to one of the covers but formed integrally, but I prefer to make the side walls or frame and back and front walls of my boxes as separate but combinable parts.

It is also obvious that fixture supports may be formed integrally in the metal of the front and back walls, but I prefer to employ demountable fixture studs when fixture supports are needed.

Each of the outlet-openings 7 is preferably formed with an outwardly projecting rim 11. The fixture-studs 10 may be attached to the cover-plates 5 in any convenient way. In Figure 3 I have shown the fixture-stud inserted through the opening 8, and provided at its base with diametrically opposite projecting ears 12 and 13. The ear 12 has a hooked end adapted to be engaged in one of the holes 9, and the ear 13 has a threaded hole adapted to be engaged by a screw passed through the opposite hole 9.

I claim as my invention:

1. In an electrical outlet-box, a peripheral side wall provided with openings, an end wall having an opening for an electric switch or fixture located at one side of the central axis of the box, and an opposite end wall having a like opening located at the opposite side of such axis in symmetrical reverse position.

2. The combination of claim 1, with means for detachably securing one of the end walls to one edge of the side wall.

3. An outlet-box having a body portion with opposite open ends adapted to be embedded in a partition wall, and end plates detachably secured over said open ends, each end plate having arranged side by side a fixture-receiving opening and a fixture-support, the fixture-support of each plate being in line with the fixture-receiving opening in the opposite plate.

In testimony whereof I have hereunto set my hand.

HUGH A. CALDERWOOD.